(12) United States Patent
Lee et al.

(10) Patent No.: US 11,972,135 B2
(45) Date of Patent: Apr. 30, 2024

(54) STATUS POLLING BASED ON DIE-GENERATED PULSED SIGNAL

(71) Applicant: Micron Technology, Inc., Boise, ID (US)

(72) Inventors: Eric N. Lee, San Jose, CA (US); Dheeraj Srinivasan, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 54 days.

(21) Appl. No.: 17/590,650

(22) Filed: Feb. 1, 2022

(65) Prior Publication Data

US 2023/0024167 A1 Jan. 26, 2023

Related U.S. Application Data

(60) Provisional application No. 63/224,270, filed on Jul. 21, 2021.

(51) Int. Cl.
*G06F 3/06* (2006.01)

(52) U.S. Cl.
CPC .......... *G06F 3/0653* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2016/0292092 A1* | 10/2016 | Gavens | G06F 3/0629 |
| 2019/0354317 A1* | 11/2019 | Fenghai | G06F 3/0679 |
| 2021/0182141 A1* | 6/2021 | Balb | G06F 11/3037 |
| 2022/0091775 A1* | 3/2022 | Shridhar | G06F 3/0655 |

* cited by examiner

*Primary Examiner* — Yaima Rigol
*Assistant Examiner* — Alexander J Yoon
(74) *Attorney, Agent, or Firm* — Lowenstein Sandler LLP

(57) ABSTRACT

A memory system includes multiple dice having multiple planes. A processing device is coupled to the dice and performs controller operations including receiving a status indicator signal comprising a pulse that is asserted by one or more planes of the multiple dice. In response to receiving the pulse, the processing device performs at least one of: a first status check of dice operations being performed by the multiple dice at an expiration of a polling delay period; or a second status check of the dice operations in response to detecting the pulse being deasserted. The processing device terminates performances of status checks while the status indicator signal remains deasserted.

17 Claims, 9 Drawing Sheets

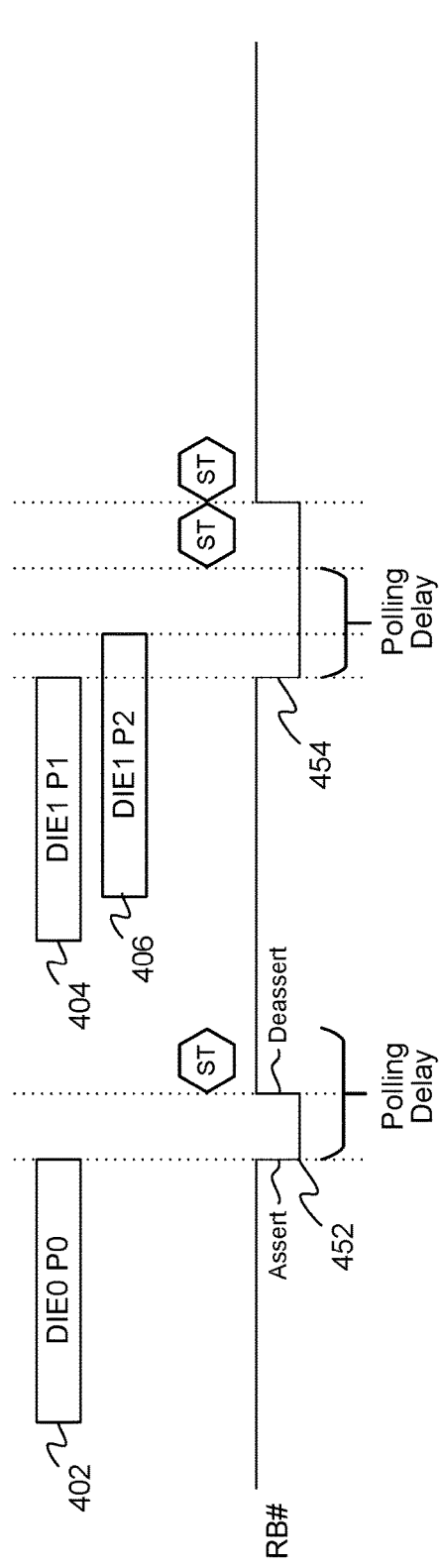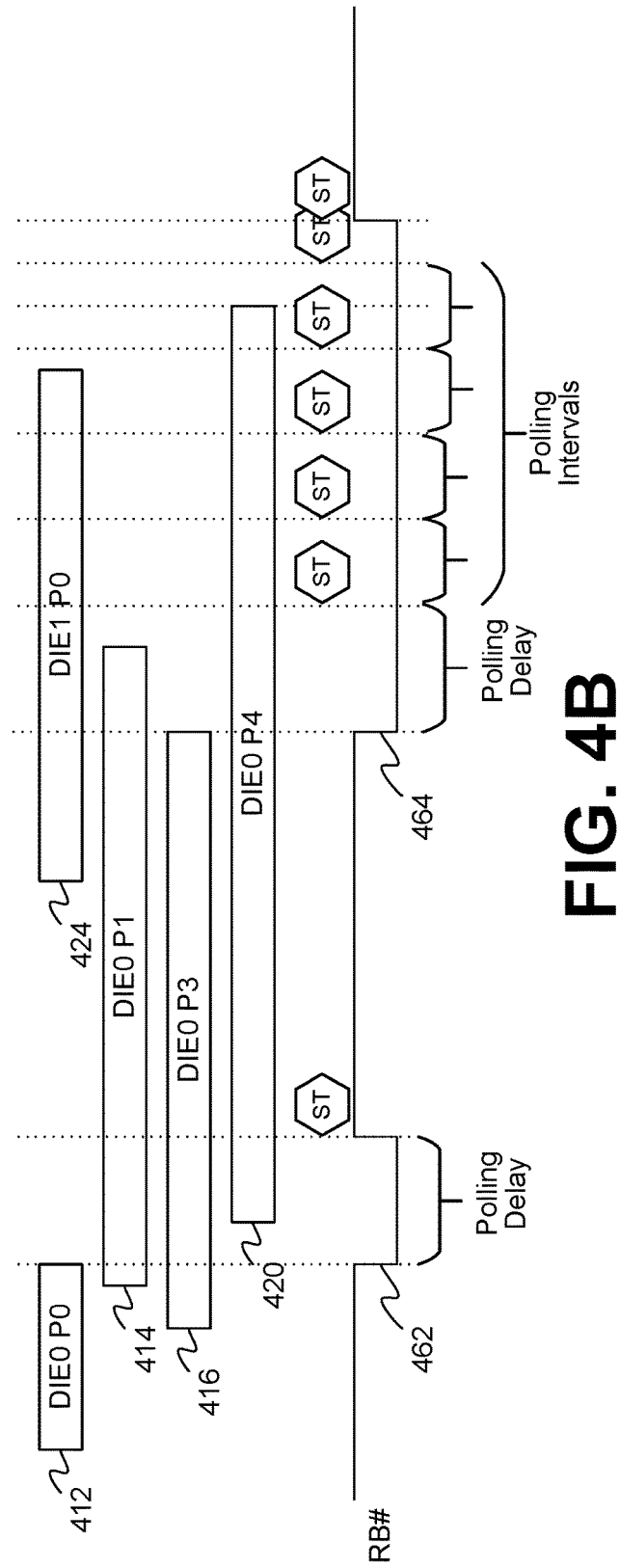

US 11,972,135 B2

STATUS POLLING BASED ON DIE-GENERATED PULSED SIGNAL

REFERENCE TO RELATED APPLICATION

This application claims the benefit of U.S. Provisional Patent Application No. 63/224,270, filed Jul. 21, 2021, the entirety of which is incorporated herein by reference.

TECHNICAL FIELD

Embodiments of the disclosure are generally related to memory sub-systems, and more specifically, relate to status polling based on die-generated pulsed signal.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIG. 4A is a graph of a status indicator signal including pulses generated by planes of multiple dice of the memory device(s) and timing of performing status checks according to an embodiment.

FIG. 4B is a graph of a status indicator signal including pulses generated by planes of multiple dice of the memory device(s) and timing of performing status checks according to another embodiment.

DETAILED DESCRIPTION

Figure 1A:
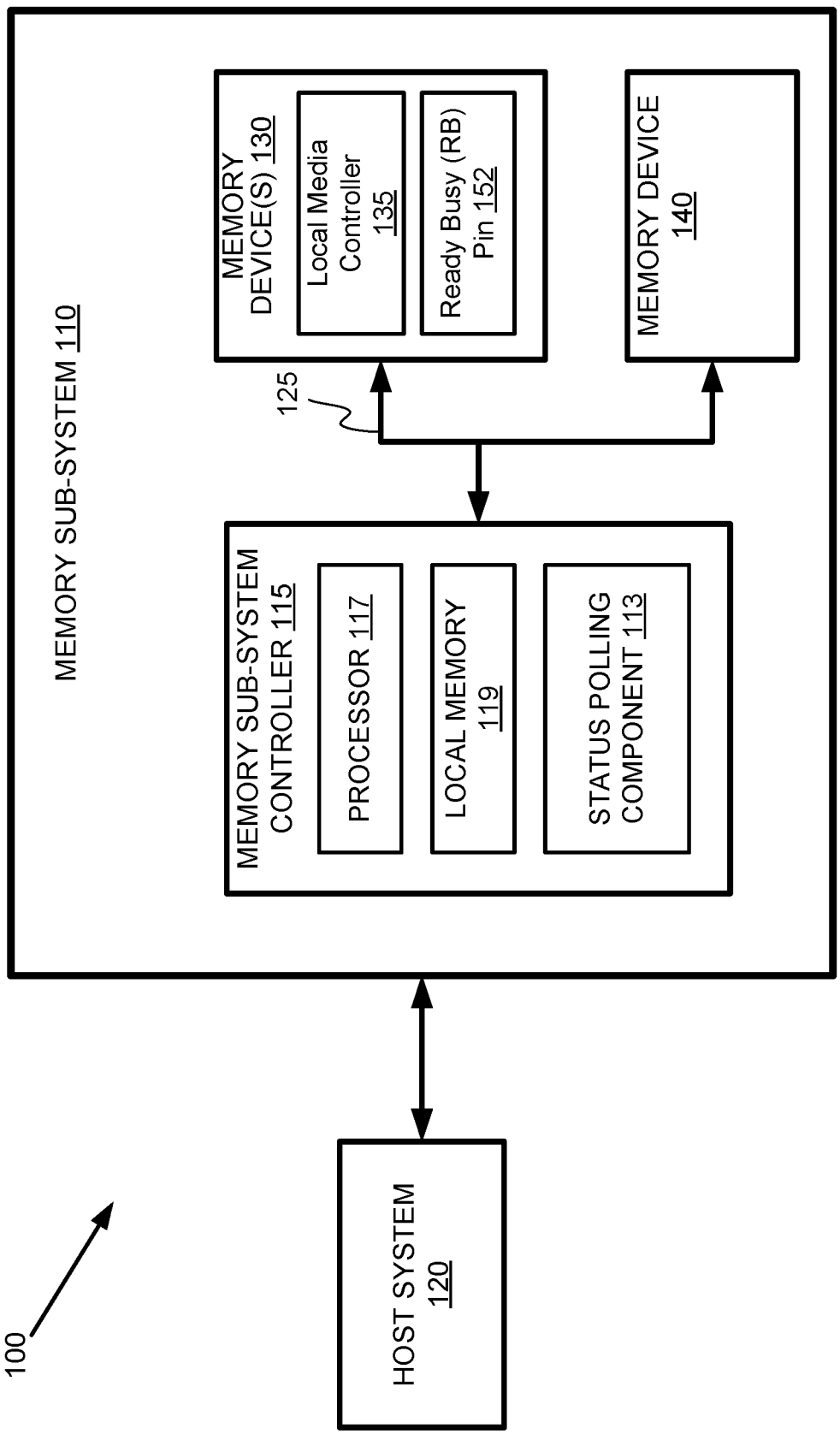
FIG. 1A illustrates an example computing system that includes a memory sub-system according to some embodiments.

Embodiments of the present disclosure are directed to status polling based on a die-generated pulsed signal. Certain memory sub-systems include a memory sub-system controller that determines when and how often to poll for statuses from multiple dice of a memory device. Polling is required because the controller needs to know which dice are available to perform a next memory operation such as an erase operation, a read operation, or a program operation. The controller polls the multiple dice and receives, in response, status updates to know when one or more dice of the multiple dice are ready to perform a next operation.

In certain memory sub-systems, for example, the memory sub-system controller waits a certain polling delay period after the start of each operation to perform a first status request, followed by subsequent status request at a polling interval thereafter. The controller blindly triggers the timing and frequency of these status requests on a per-operation basis, which, therefore, causes the status checks to be performed more often than necessary. Such repetitive status requests between the controller and the memory device causes congestion on a communication bus and/or interface between the controller and the memory device, which consumes significant overhead in communication bandwidth that could otherwise be used for other control signals and data. The consumption of overhead can slow down and impact performance of the memory sub-system.

Aspects of the present disclosure address the above and other deficiencies through causing the memory sub-system controller to perform status checks according to pulses on a status indicator signal received from the multiple dice. In some embodiments, the pulses are generated by an aggregate of multiple planes across the multiple dice and communicated over a ready busy (RB) pin that is coupled with the multiple dice and the controller (e.g., processing device). More specifically, the status indicator signal can remain deasserted (which can, for example, be a logical 0 or 1 in different embodiments) and be asserted (e.g., the opposite logical value from being deasserted) by pulses from the planes and dice to indicate a status change, such as to indicate a completion of a memory operation (program, erase, read), among other information such as reaching a temperature trigger, detection of an error, detection of a security event, or the like, which will be discussed in more detail. In some embodiments, the pulses from different planes and dice can be asserted in a way that partially overlaps, thus the pulses during which status checks are performed can be extended for periods of time. Further, when the status indicator signal is deasserted, no status checks are performed. In this way, the controller performs status checks in response to changes in status and when there is new status information to be received.

In at least some embodiments, the memory sub-system controller performs operations that include receiving a status indicator signal with a pulse that is asserted by one or more planes of the multiple dice or simply by one or more of the multiple dice. In response to detecting the pulse, the operations include performing at least one of a first status check of dice operations being performed by the dice at an expiration of a polling delay period or a second status check of the dice operations in response to detecting the pulse be deasserted. If the pulse is longer than the polling delay period, then the controller performs both the first status check and the second status check. In some embodiments, the polling delay period is set to be greater than or equal to a pulse width of the pulses received from the dice, thus minimizing status checks for a single completion situation. In cases of extended pulses where status pulses are generated that overlap on the status indicator signal, the operations further include performing one or more additional status checks of the dice operations at a polling interval after expiration of the polling delay period and before detecting the pulse be deasserted. The operations further include terminating performances of status checks while the status indicator signal remains deasserted.

Therefore, advantages of the systems and methods implemented in accordance with some embodiments of the present disclosure include, but are not limited to, the controller performing status polling only when an operation on the memory device has completed or had a change in status. This practice by the controller increases polling efficiency, particularly for program and erase operations, and reduces bus (or other communication interface) congestion due to the polling. The controller hardware is also simplified in having no need to keep track of timers for each operation in execution. Other advantages will be apparent to those skilled in the art as discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such media or memory devices. The memory sub-system 110 can be a storage device, a memory module, or a hybrid of a storage device and memory module.

The memory device(s) 130 can be non-volatile memory device(s). One example of non-volatile memory devices is a negative-and (NAND) memory device. A non-volatile memory device is a package of one or more dice or logic units (LUNs). Thus, each memory device 130 can be a die (or LUN) or can be a multi-dice package that includes multiple dice (or LUNs) on a chip, e.g., an integrated circuit package of dice. Each die can include one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Each memory device 130 can be made up of bits arranged in a two-dimensional or three-dimensional grid, also referred to as a memory array. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. The host system 120 can provide data to be stored at the memory sub-system 110 and can request data to be retrieved from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., the one or more memory device(s) 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLCs) can store multiple bits per cell, e.g., by way of additional threshold voltage ranges. In some embodiments, each of the memory device(s) 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory device(s) 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 or processing device for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage a memory device 130 (e.g., perform media management operations on the memory device 130). In some embodiments, memory sub-system 110 is a managed memory device, which is a raw memory device having control logic (e.g., local media controller 135) on the die and a controller (e.g., memory sub-system controller 115) for media management within the same memory device package. An example of a managed memory device is a managed NAND (MNAND) device.

In some embodiments, each memory device 130 further includes a ready busy pin 152 (or RB pin 152) that is coupled with multiple dice of the memory device(s) 130 as well as being coupled with the memory sub-system controller 115, e.g., over a communication bus 125. In various embodiments, the communication bus 125 is or includes an open NAND flash interface (ONFI). The communication bus 125 can also include other command, address, and data interface, including but not limited to a shared bus, configurable channels, and separate command/address bus schemes, over which the polling occurs.

In these embodiments, the controller 115 further includes a status polling component 113. The status polling component 113 can monitor a status indicator signal received over the RB pin 152 (or other status input/output (I/O) pins that will be discussed) in order to detect pulses being asserted and deasserted on the status indicator signal by one or more planes and/or dice of the memory device(s) 130. The status polling component 113 can manage polling the multiple planes and/or dice depending on detection of these pulses being asserted and deasserted throughout operation, as will be discussed in more detail with reference to FIGS. 2A-3, FIGS. 4A-4B, and FIGS. 5-6. In some embodiments, the status polling component is integrated in whole or in part within the host system 120.

Figure 1B:
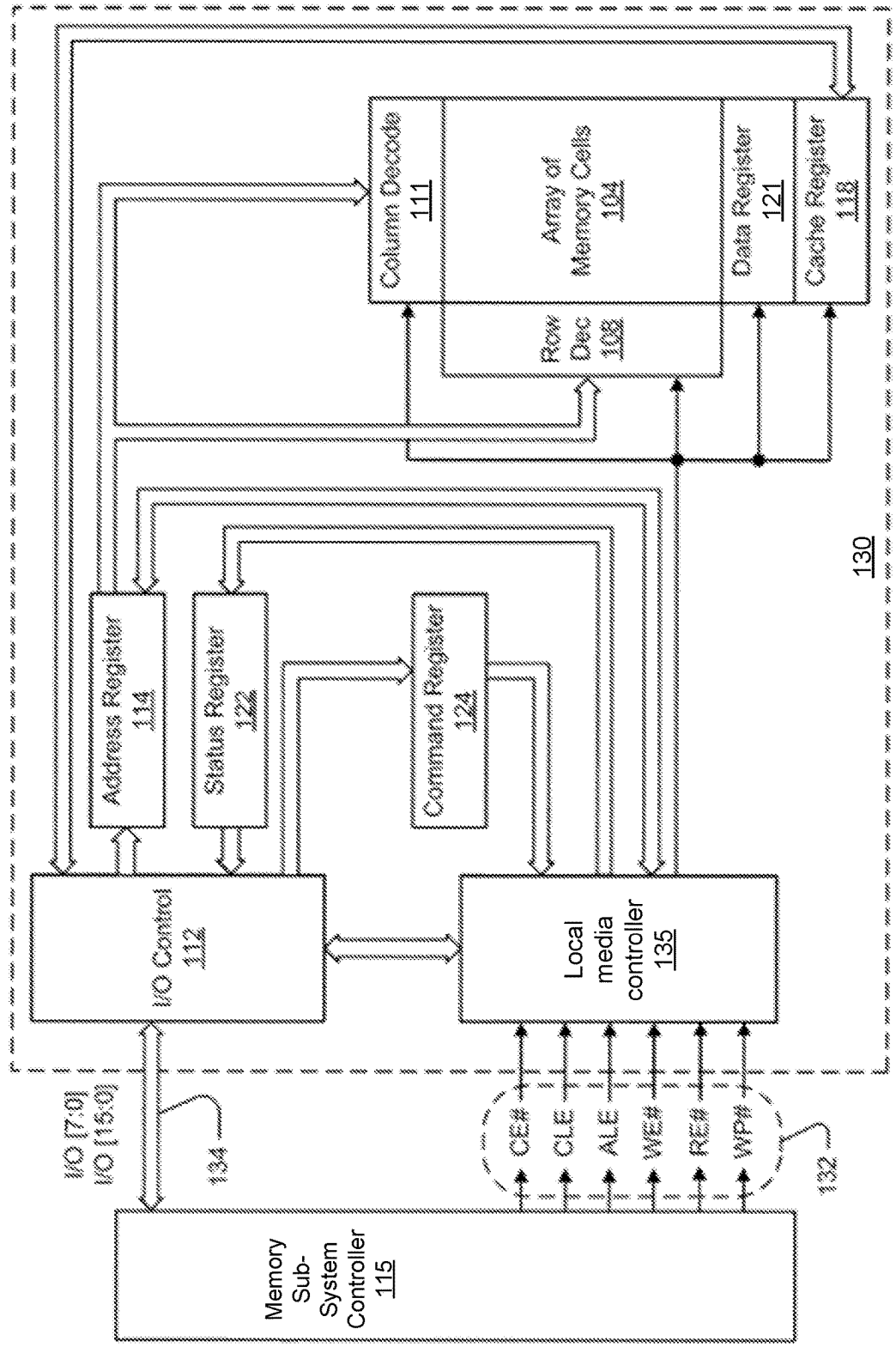
FIG. 1B is a block diagram of memory device(s) in communication with a memory sub-system controller of a memory sub-system according to an embodiment.

FIG. 1B is a simplified block diagram of a first apparatus, in the form of the one or more memory device(s) 130, in communication with a second apparatus, in the form of a memory sub-system controller 115 of a memory sub-system (e.g., the memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to each memory device 130), can be a memory controller or other external host device.

Each memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 1B) of at least a portion of the array of memory cells 104 are capable of being programmed to one of at least two target data states.

Row decode circuitry 108 and column decode circuitry 111 are provided to decode address signals. Address signals are received and decoded to access the array of memory cells 104. Each memory device 130 also includes input/output (I/O) control circuitry 112 to manage input of commands, addresses and data to the memory device 130 as well as output of data and status information from each memory device 130. An address register 114 is in communication with the I/O control circuitry 112 and row decode circuitry 108 and column decode circuitry 111 to latch the address signals prior to decoding. A command register 124 is in communication with the I/O control circuitry 112 and local media controller 135 to latch incoming commands.

A controller (e.g., the local media controller 135 internal to each memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses.

The local media controller 135 is also in communication with a cache register 118 and a data register 121. The cache register 118 latches data, either incoming or outgoing, as directed by the local media controller 135 to temporarily store data while the array of memory cells 104 is busy writing or reading, respectively, other data. During a program operation (e.g., write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form at least a portion of) a page buffer of each memory device 130. The page buffer can further include sensing devices such as a sense amplifier, to sense a data state of a memory cell of the array of memory cells 104, e.g., by sensing a state of a data line connected to that memory cell. A status register 122 can be in communication with I/O control circuitry 112 and the local memory controller 135 to latch the status information for output to the memory sub-system controller 115.

Each memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of each memory device 130. In one embodiment, each memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 112 and can then be written into a command register 124. The addresses can be received over input/output (I/O) pins [7:0] of I/O bus 134 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104. In an embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to each memory device 130 by an external device (e.g., the memory sub-system controller 115), such as conductive pads or conductive bumps as are commonly used.

It will be appreciated by those skilled in the art that additional circuitry and signals can be provided, and that each memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2A:
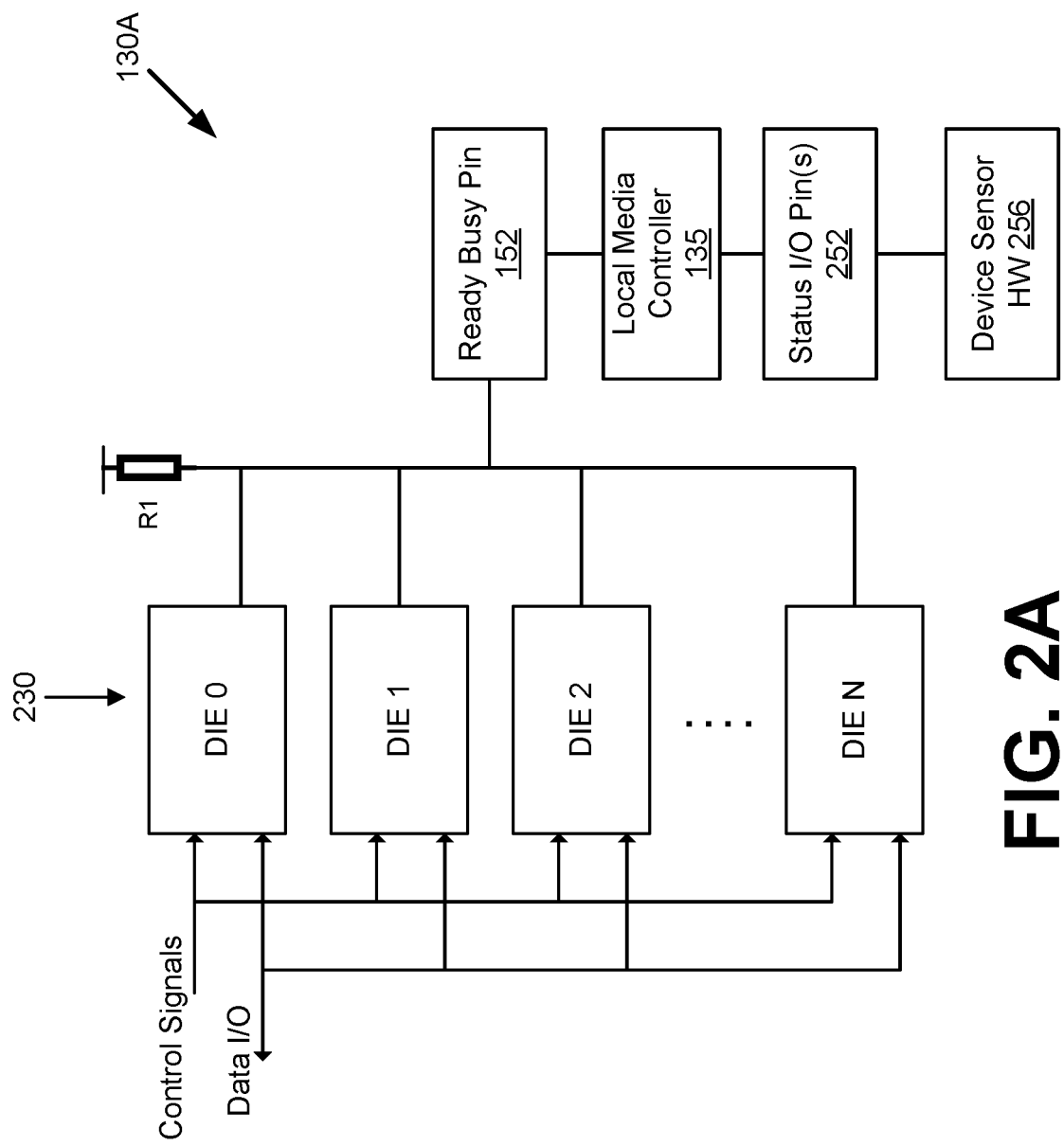
FIG. 2A is a schematic block diagram of an example of the memory device(s) including multiple dice and other sensor hardware that provide indicator pulses to control logic according to some embodiments.

FIG. 2A is a schematic block diagram of an example of the memory device(s) 130, e.g., memory device(s) 130A, including multiple dice 230 (e.g., die_0, die_1, die_2, . . . die_N) and other sensor hardware that provide indicator pulses to control logic according to some embodiments. The memory device(s) 130A can further include, in addition to the ready busy (RB) pin 152 coupled with the multiple dice 230 and the local media controller 135, one or more status I/O pins 252 coupled between die sensor hardware 256 and the local media controller 135. Thus, each die and/or plane (see FIG. 2B) of the multiple dice 230 can assert a pulse at the RB pin 152 to indicate the die/plane has completed an operation and is ready, or keep the status indicator signal sent over the RB pin 152 deasserted to indicate that the die/plane is busy.

Similarly, in at least some embodiments, other hardware and/or control logic of the memory device(s) 130A can assert a pulse at one or more status I/O pins 252 to indicate completion or triggering of a particular device status that may not be directly related to program/erase/read operations performed at the multiple dice, but nonetheless are associated with dice functionality. For example, the particular status can be associated with the die sensor hardware 256 or statuses tracked directly by the local media controller 135. These particular statuses received from the die sensor hardware 256 can include, but not be limited to, a temperature status (e.g., a thermocouple reaching a particular temperature threshold limit), a power event or power status (e.g., supply voltages out of range, supply noise out of specification), or a security event (e.g., unauthorized access, secure area access, fail authentication, or the like). Further, the particular statuses received from the local media controller 135 can include a suspend completion of dice operation, an error status (e.g., program fail, erase fail, or read errors that exceed a threshold bit error rate (BER)), or similar type of operational statuses beyond memory operation completion.

In various embodiments, therefore, the operations can further include receiving a second status indicator signal with a second pulse that is asserted by sensor hardware of the memory device, e.g., the device sensor hardware 256. In response to detecting the second pulse, the operations further include performing at least one of a third status check of device operations being performed by the memory device(s) 130 at expiration of the polling delay period or a fourth status check of the device operations in response to detecting the second pulse be deasserted. The operations can further include terminating performances of status checks while the second status indicator signal remains deasserted. In some embodiments, the device operations include one of a suspend completion of a memory operation, a power event status, a security event status, or a temperature status associated with the memory device.

Figure 2B:
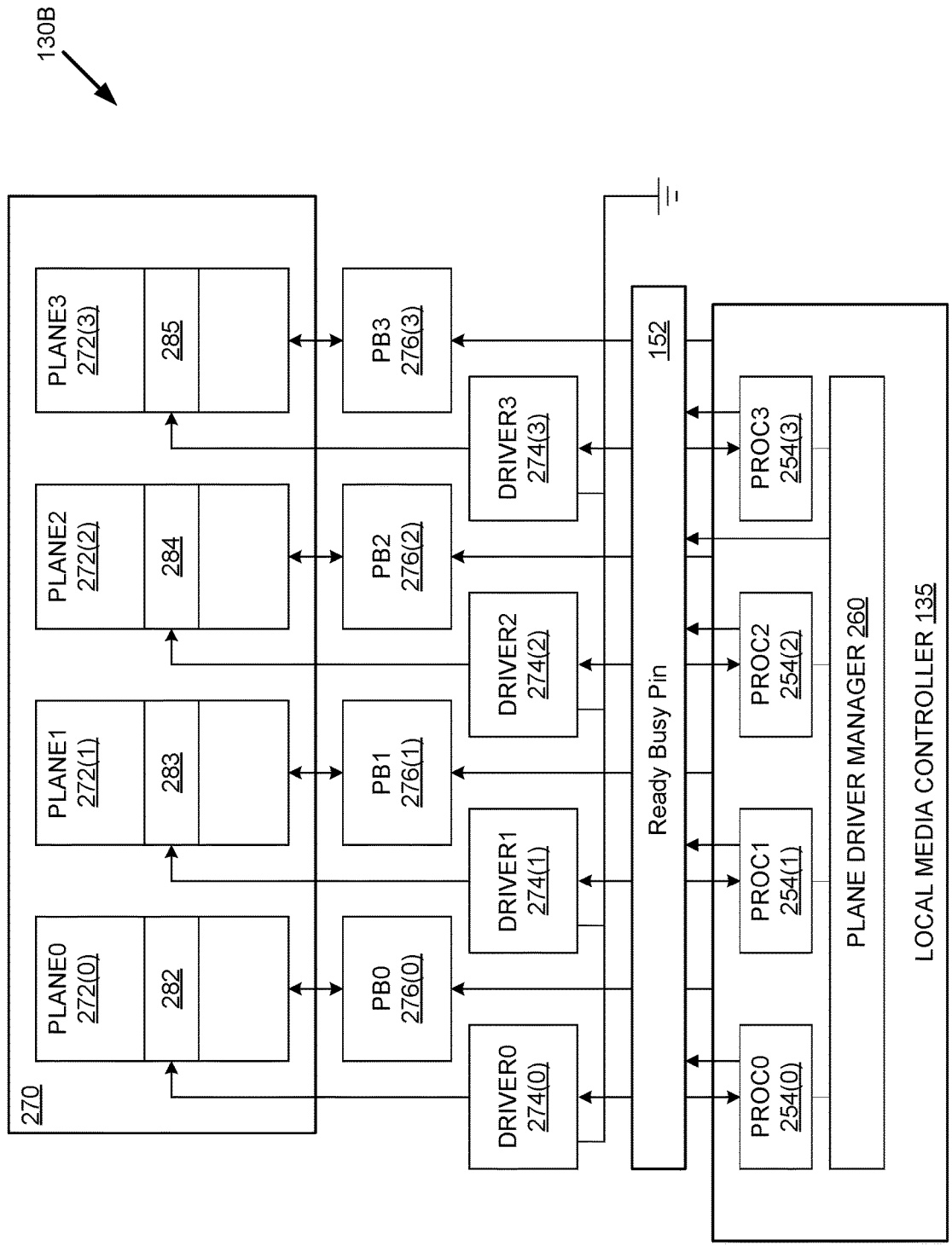
FIG. 2B is a schematic block diagram illustrating a multi-plane memory device configured for noise reduction during parallel plane access in accordance with some embodiments of the present disclosure.

FIG. 2B is a schematic block diagram illustrating a multi-plane memory device 130B configured for noise reduction during parallel plane access in accordance with some embodiments of the present disclosure. The memory planes 272(0)-272(3) can each be divided into blocks of data, with a different relative block of data from two or more of the memory planes 272(0)-272(3) concurrently accessible during memory access operations. For example, during memory access operations, two or more of data block 282 of the memory plane 272(0), data block 283 of the memory plane 272(1), data block 284 of the memory plane 272(2), and data block 285 of the memory plane 272(3) can each be accessed concurrently.

The memory device 130B includes a memory array 270 divided into memory planes 272(0)-272(3) that each includes a respective number of memory cells. In various embodiments, the memory array 270 is included in one or more dice of the multiple dice 230 (FIG. 2A). The multi-plane memory device 130B can further include the local media controller 135, including a power control circuit and access control circuit for concurrently performing memory access operations for different memory planes 272(0)-272(3). The memory cells can be non-volatile memory cells, such as NAND flash cells, or can generally be any type of memory cells.

The memory planes 272(0)-272(3) can each be divided into blocks of data, with a different relative block of data from each of the memory planes 272(0)-272(3) concurrently accessible during memory access operations. For example, during memory access operations, data block 282 of the memory plane 272(0), data block 283 of the memory plane 272(1), data block 284 of the memory plane 272(2), and data block 285 of the memory plane 272(3) can each be accessed concurrently.

Each of the memory planes 272(0)-272(3) can be coupled to a respective page buffer 276(0)-276(3). Each page buffer 276(0)-276(3) can be configured to provide data to or receive data from the respective memory plane 272(0)-272(3). The page buffers 276(0)-276(3) can be controlled by local media controller 135. Data received from the respective memory plane 272(0)-272(3) can be latched at the page buffers 276(0)-276(3), respectively, and retrieved by local media controller 135, and provided to the memory sub-system controller 115 via the NVMe interface.

Each of the memory planes 272(0)-272(3) can be further coupled to a respective access driver circuit 274(0)-274(3), such as an access line driver circuit. The driver circuits 274(0)-274(3) can be configured to condition a page of a respective block of an associated memory plane 272(0)-272(3) for a memory access operation, such as programming data (i.e., writing data), reading data, or erasing data. Each of the driver circuits 274(0)-274(3) can be coupled to a respective global access lines associated with a respective memory plane 272(0)-272(3). Each of the global access lines can be selectively coupled to respective local access lines within a block of a plane during a memory access operation associated with a page within the block. The driver circuits 274(0)-274(3) can be controlled based on signals from local media controller 135. Each of the driver circuits 274(0)-274(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 274(0)-274(3) and page buffers 276(0)-276(3) to concurrently perform memory access operations associated with each of a group of memory command and address pairs (e.g., received from memory sub-system controller 115). For example, local media controller 135 can control the driver circuits 274(0)-274(3) and page buffer 376(0)-376(3) to perform the concurrent memory access operations. Local media controller 135 can include a power control circuit that serially configures two or more of the driver circuits 274 (0)-274(3) for the concurrent memory access operations, and an access control circuit configured to control two or more of the page buffers 276(0)-276(3) to sense and latch data from the respective memory planes 272(0)-272(3), or program data to the respective memory planes 272(0)-272(3) to perform the concurrent memory access operations.

In operation, the local media controller 135 can receive a group of memory command and address pairs via the NVMe interface, with each pair arriving in parallel or serially. In some examples, the group of memory command and address pairs can each be associated with different respective memory planes 272(0)-272(3) of the memory array 270. The local media controller 135 can be configured to perform concurrent memory access operations (e.g., read operations or program operations) for the different memory planes 272(0)-272(3) of the memory array 270 responsive to the group of memory command and address pairs. For example, the power control circuit of local media controller 135 can serially configure, for the concurrent memory access operations based on respective page type (e.g., upper page (UP), middle page (MP), lower page (LP), extra page (XP), SLC/MLC/TLC/QLC page), the driver circuits 274(0)-274(3) for two or more memory planes 272(0)-272(3) associated with the group of memory command and address pairs. After the access line driver circuits 274(0)-274(3) have been configured, the access control circuit of the local media controller 135 can concurrently control the page buffers 276(0)-276(3) to access the respective pages of each of the two or more memory planes 272(0)-272(3) associated with the group of memory command and address pairs, such as retrieving data or writing data, during the concurrent memory access operations. For example, the access control circuit can concurrently (e.g., in parallel and/or contemporaneously) control the page buffers 276(0)-276(3) to charge/discharge bitlines, sense data from the two or more memory planes 272(0)-272(3), and/or latch the data.

Based on the signals received from local media controller 135, the driver circuits 274(0)-274(3) that are coupled to the memory planes 272(0)-272(3) associated with the group of memory command and address command pairs can select blocks of memory or memory cells from the associated memory plane 272(0)-272(3), for memory operations, such as read, program, and/or erase operations. The driver circuits 274(0)-274(3) can drive different respective global access lines associated with a respective memory plane 272(0)-272(3). As an example, the driver circuit 274(0) can drive a first voltage on a first global access line associated with the memory plane 272(0), the driver circuit 274(1) can drive a second voltage on a third global access line associated with the memory plane 272(1), the driver circuit 274(2) can drive a third voltage on a seventh global access line associated with the memory plane 272(2), etc., and other voltages can be driven on each of the remaining global access lines. In some examples, pass voltages can be provided on all access lines except an access line associated with a page of a memory plane 272(0)-272(3) to be accessed. The driver circuits 274(0)-274(3) and the page buffers 276(0)-276(3) can allow access to different respective pages within different respective blocks of memory cells to be accessed concurrently. For example, a first page of a first block of a first memory plane can be accessed concurrently with a second page of a second block of a second memory plane, regardless of page type.

The page buffers 276(0)-276(3) can provide data to or receive data from the local media controller 135 during the memory access operations responsive to signals from the local media controller 135 and the respective memory planes 272(0)-272(3). The local media controller 135 can provide the received data to memory sub-system controller 115.

It will be appreciated that the memory device 130B can include more or less than four memory planes, driver circuits, and page buffers. It will also be appreciated that the respective global access lines can include 8, 16, 32, 64, 128, etc., global access lines. In another embodiment, memory device 130B can include fewer driver circuits than there are planes. In such an embodiment, memory device 130B can further includes a plane selection circuit (e.g., a number of bi-directional multiplexer circuits) controlled by control signals received from local media controller 135. The plane selection circuit allows any of the driver circuits to be selectively coupled to any of the memory planes in memory device 130B. In this manner, there is not a fixed association between any of the driver circuits and any of the planes.

Additionally, in at least some embodiments, each of processors 254(0)-254(3) can receive instructions from a plane driver manager 260, such as whether to permit, suspend, or resume quiet events or high noise events during the operations being performed by the corresponding one of driver circuits 274(0)-274(3), to manage timing of execution such operations, e.g., program, erase, or read operations at the memory planes 272(0)-272(3), and/or handling of errors detected in such memory operations. For example, each of the processors 254(0)-254(3) can monitor the status of operations being performed by the corresponding one of driver circuits 274(0)-274(3) and report that status to plane driver manager 260.

In at least some embodiments, each of processors 254(0)-254(3) also detects when a particular plane of the memory planes 272(0)-272(3) becomes available due to completion of a previous operation, such as an erase operation, a program operation, or a read operation at the plane driven by the particular driver circuit 274(0)-274(3) that is coupled with one of the processors 254(0)-254(3), respectively. Thus, each processor 254(0)-254(3) can detect activity of a respective driver circuit 274(0)-274(3) to determine the completion status, for example. In response to detecting completion of a memory operation, a respective processor 254(0)-254(3) or the plane driver manager 260 can assert a pulse on the status indicator signal of the RB pin 152. In this way, the local media controller 135 can provide plane-specific status pulses to the memory sub-system controller 115, which include asserting and deasserting pulses to indicate read/busy status associated with completion or continuation of a memory operation.

Figure 3:
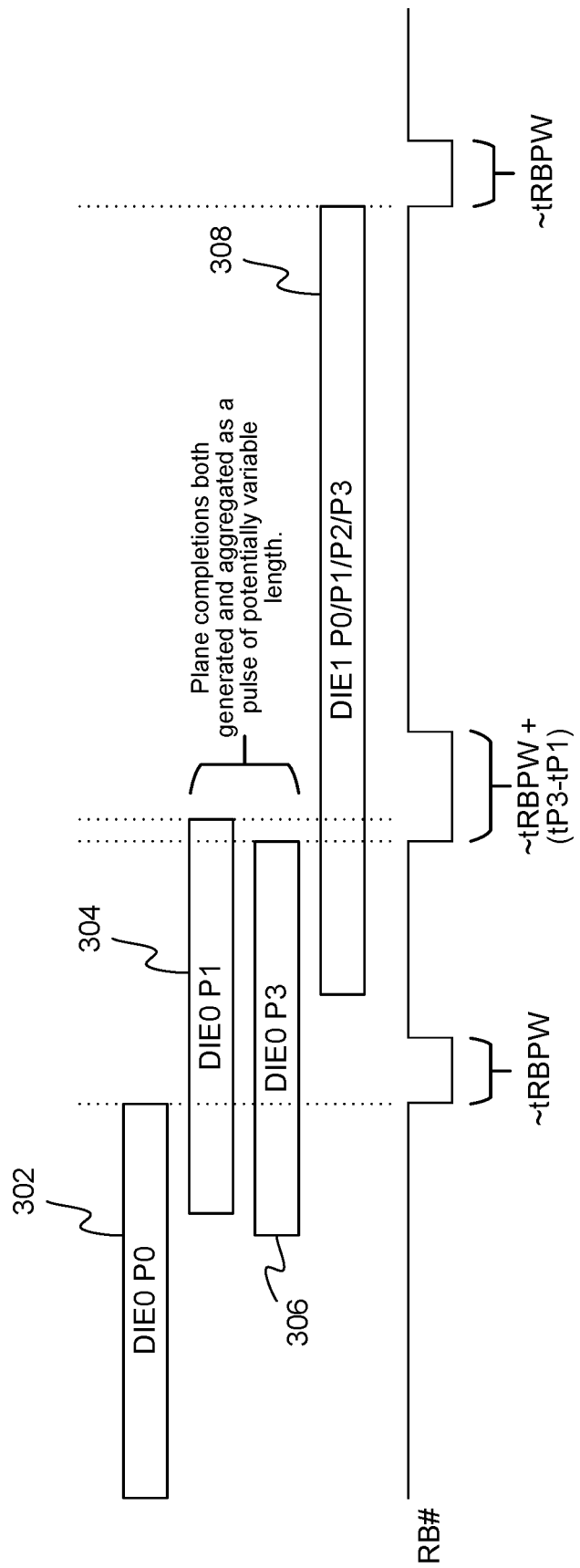
FIG. 3 is a graph of a status indicator signal that include pulses generated by planes of multiple dice of the memory device(s) according to some embodiments.

FIG. 3 is a graph of a status indicator signal that include pulses generated by planes of multiple dice of the memory device(s) according to some embodiments. In various embodiments, the ready busy signal (RB #) can now be pulsed low (e.g., asserted) for status changes from ready (RDY) equal to a logical one to ready equal to a logical zero for a duration of about a ready busy signal pulse width (~tRBPW). Thus, the pulse indicates a transition to a ready state in some embodiments. In at least some embodiments, there is a common read busy signal (e.g., on ready busy pin 152) across the multiple dice 230 and plane groups discussed with reference to FIGS. 2A-2B. Thus, each pulse on the ready busy signal (referred to generally herein as a status indicator signal) can correspond to anywhere from 1 to N dice per channel times a number of independent wordline threads, providing an ability to track status of any plane/die, group of planes/dice, or of any individual die regardless of plane.

With reference to FIG. 3, a first operation 302 completes first while a second operation 304 and a third operation 306 complete next, all being performed concurrently at a first die (DIE0), but at different planes, plane_0 (P0) and plane_1

(P1), respectively. Finally a group of operations 308 complete that are being performed concurrently at a second die (DIE1). While the status indicator signal (e.g., RB #) is deasserted (e.g., at a logical high value in this example), there is no change in status of these operations. However, upon completion of the first operation 302, control logic (e.g., the local media controller 135) asserts a pulse on the status indicator signal. As illustrated, this is a standard pulse with a standard pulse width (~tRBPW).

In response to the second operation 304 and the third operation 306 completing, the respective control logic of each plane (P1, P3) asserts a separate pulse to indicate completion of the respective operation. Because these separate pulses partially overlap, what is sent over the status indicator signal is an extended pulse, e.g., of length of a standard pulse (~tRBPW) plus a difference in completion time of the second and third operations (tP3−tP1). Thus, when operations of different planes/dice complete close in time to each other, the aggregation of their respective pulses assert a pulse of potentially variable length. Further, when the group of operations 308 of the second die completes, the control logic again asserts a pulse of a standard width (~tRBPW), following which the status indicator signal is again deasserted.

FIG. 4A is a graph of a status indicator signal including pulses generated by planes of multiple dice of the memory device(s) 130 and timing of performing status checks according to an embodiment. A polling delay period can be set for the controller 115 to wait, after detecting a pulse being asserted on the status indictor signal, before the start of performing status checks of the multiple planes and dice of the memory device(s) 130. To minimize status checks for a single completion situation, the polling delay period can be set to be greater than or equal to the standard pulse width of the pulses being asserted by the multiple dice 230.

In these embodiments, once status checks are started after the polling delay period, the controller 115 can perform additional status checks at a polling interval as long as the pulse remains asserted, e.g., in the case of an extended pulse. Further, the controller 115 can perform a final status check upon detecting the status indicator signal be deasserted. This final status check can be performed to ensure capturing all completion transitions from the multiple dice 230 before terminating performing status checks while the status indicator signal remains deasserted. While the illustrated embodiments show a pulse being asserted as going from high to low and a pulse being deasserted as going from low to high, the opposite can be implemented in alternative embodiments.

Thus, with reference to embodiments of FIG. 4A, a first operation 402 completes first followed by a second operation 404 and a third operation 406 that complete sometime later. When the controller 115 detects a first pulse 452 being asserted on the status indictor signal, the controller begins waiting the polling delay period. But, because the first pulse 450 is deasserted early (e.g., in the case that the pulse width of a standard pulse is shorter than the polling delay period), then the controller 115 performs only one status check (ST) in response to detecting the first pulse 450 be deasserted.

Further, the second operation 404 and the third operation 406 complete close in time to each other and their respective pulses are aggregated to generate an extended pulse 454. Thus, in this embodiment, the controller 115 starts performing a status check after expiration of the polling delay period, which was triggered at the beginning of the assertion of the extended pulse 454. Finally, shortly thereafter, the controller 115 detects the extended pulse 454 be deasserted and thus performs a final status check.

FIG. 4B is a graph of a status indicator signal including pulses generated by planes of multiple dice of the memory device(s) and timing of performing status checks according to another embodiment. In some embodiments, this graph can also represent dice that generate these pulses where each operation is performed by a different die. As illustrated, however, a first operation 412 completes early on while a third operation 416 completes next, followed by completion of a second operation 414, followed by completion of a fifth operation 424, followed ultimately by completion of a fourth operation 420, where the operations are labeled sequentially by when the operation starts compared to start times of the other operations for simplicity of explanation. While plane of DIE0 are especially active, the fifth operation is being performed by DIE1. Again, each pulse is an indication that a status in at least one of the operations has changed, e.g., has completed and therefore the plane/die performing the operation is now ready to perform another operation.

In this embodiment, because a first pulse 462 being asserted by a first die and plane (DIE0 P0) has a width of the polling delay period, only a single status check (ST) need be performed in response to either of the expiration of the polling delay period or detection of the first pulse 462 being deasserted. As is evident, a second pulse 464 is an extended pulse that is substantially longer than the first pulse 462 on the status indicator signal (RB #). When each of the remaining operations completes, the corresponding die/plane issues a pulse onto the status indicator signal, resulting in an aggregation of multiple overlapping pulses that generates an extended pulse. Thus, the controller 115 can perform (e.g., initiate) multiple status checks, one after expiration of the polling delay period, then four additional status checks at polling intervals. As mentioned, each of the polling delay period and each polling interval can be set to be greater than or equal to a pulse width of the pulse.

Further, the controller 115 can perform a sixth (and final) status check in response to detecting the second pulse 464 be deasserted, e.g., go back high again. Thus, while many status checks are performed, some of these status checks gathered additional status information because so many operations were completing close in time to each other. For example, the first status check determined that the second operation 414 and third operation 416 both completed. Further, the fourth status check determined that the fourth operation 420 and the fifth operation 424 both completed. While the sixth status check did not obtain additional information, it was performed to ensure securing any final status of any active operation in response to the second pulse 464 being deasserted, and thus terminating initiation any further status checks.

Figure 5:
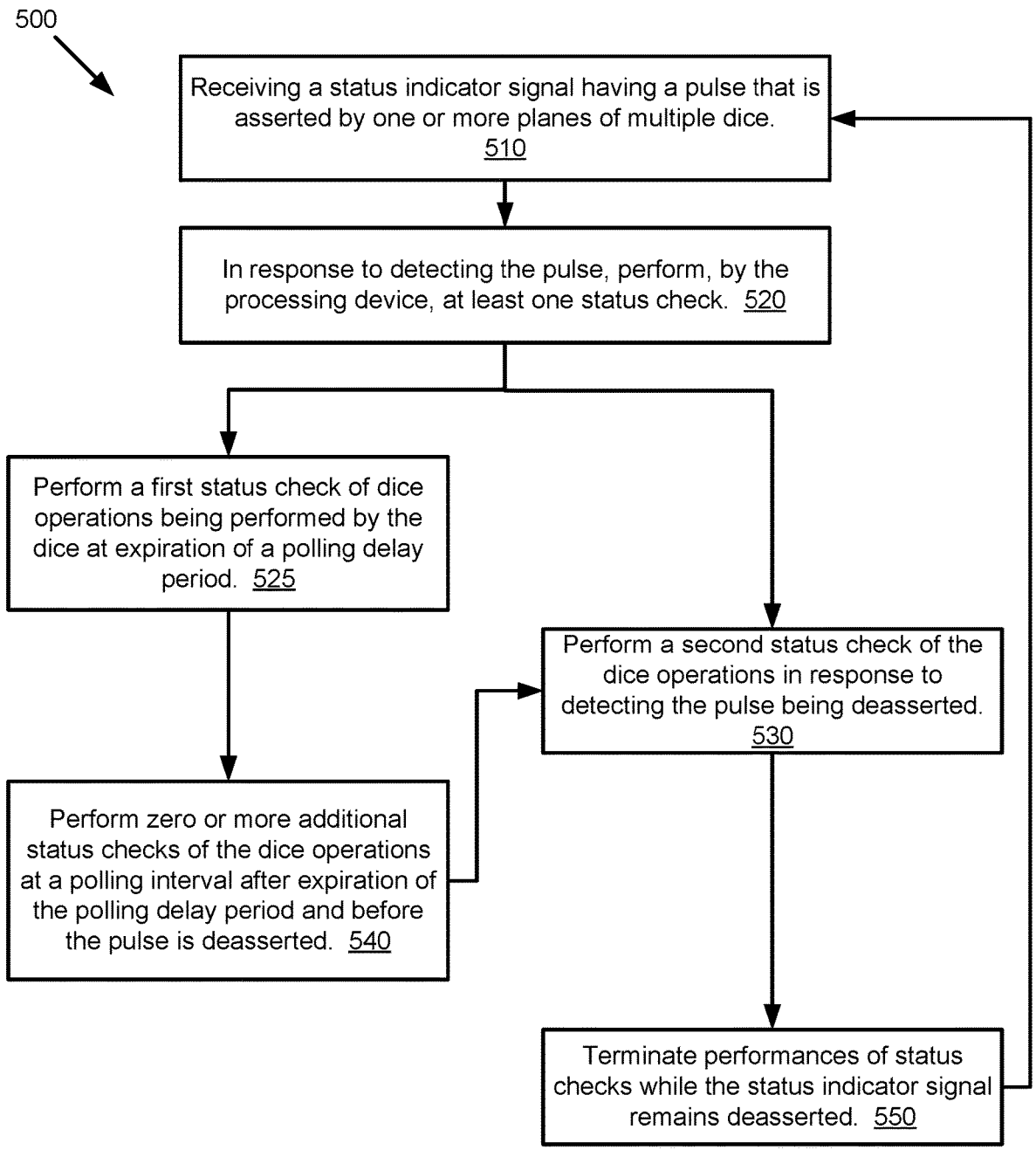
FIG. 5 is a flow diagram of an example method of performing status checks based on a plane-generated pulsed signal according to an exemplary embodiment.

FIG. 5 is a flow diagram of an example method 500 of performing status checks based on a plane-generated pulsed signal according to an exemplary embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by a processing device such as the memory sub-system controller 115 of FIG. 1A. In one embodiment, the method 500 is performed by the status polling component 113 of the memory sub-system controller 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, a signal is received. For example, the processing logic (e.g., status polling component 113) receives the signal, such as a status indicator signal having a pulse that is asserted by one or more planes of the multiple dice 230.

At operation 520, a status check is performed. For example, the processing logic, in response to detecting the pulse, performs at least one status check. For example, at operation 525, the processing logic performs a first status check of dice operations being performed by the multiple dice at expiration of a polling delay period. Or, at operation 530, the processing logic performs a second status check of the dice operations in response to detecting the pulse being deasserted.

If the pulse is longer than the polling delay period, at operation 540, additional status checks are performed. For example, the processing logic also performs zero or more additional status checks of the dice operations at a polling interval after expiration of the polling delay period and before detecting the pulse being deasserted. No additional status check is performed if the longer pulse does not reach at least one polling interval, and will perform at least one additional status check if the longer pulse extends beyond the polling delay period plus the duration of at least one polling interval. The zero or more additional status checks, if performed, can be performed before initiating the second status check at operation 530.

In the case of operation 540, receiving the status indicator signal can include receiving a first pulse from a first plane of the one or more planes corresponding to an end of a first die operation and receiving a second pulse from a second plane of the one or more planes corresponding to an end of a second die operation. The first pulse and the second pulse partially overlap to cause the pulse to be an extended pulse.

At operation 550, status checks are terminated. For example, the processing logic terminates performances of status checks while the status indicator signal remains deasserted. This default behavior of polling for status checks enables reducing congestion, and thus conserving bandwidth, across a communication bus or other interface between the controller 115 and the memory device(s) 130. The method 500 can then loop back to operation 510 to monitor for pulse(s) on the status indicator signal.

Figure 6:
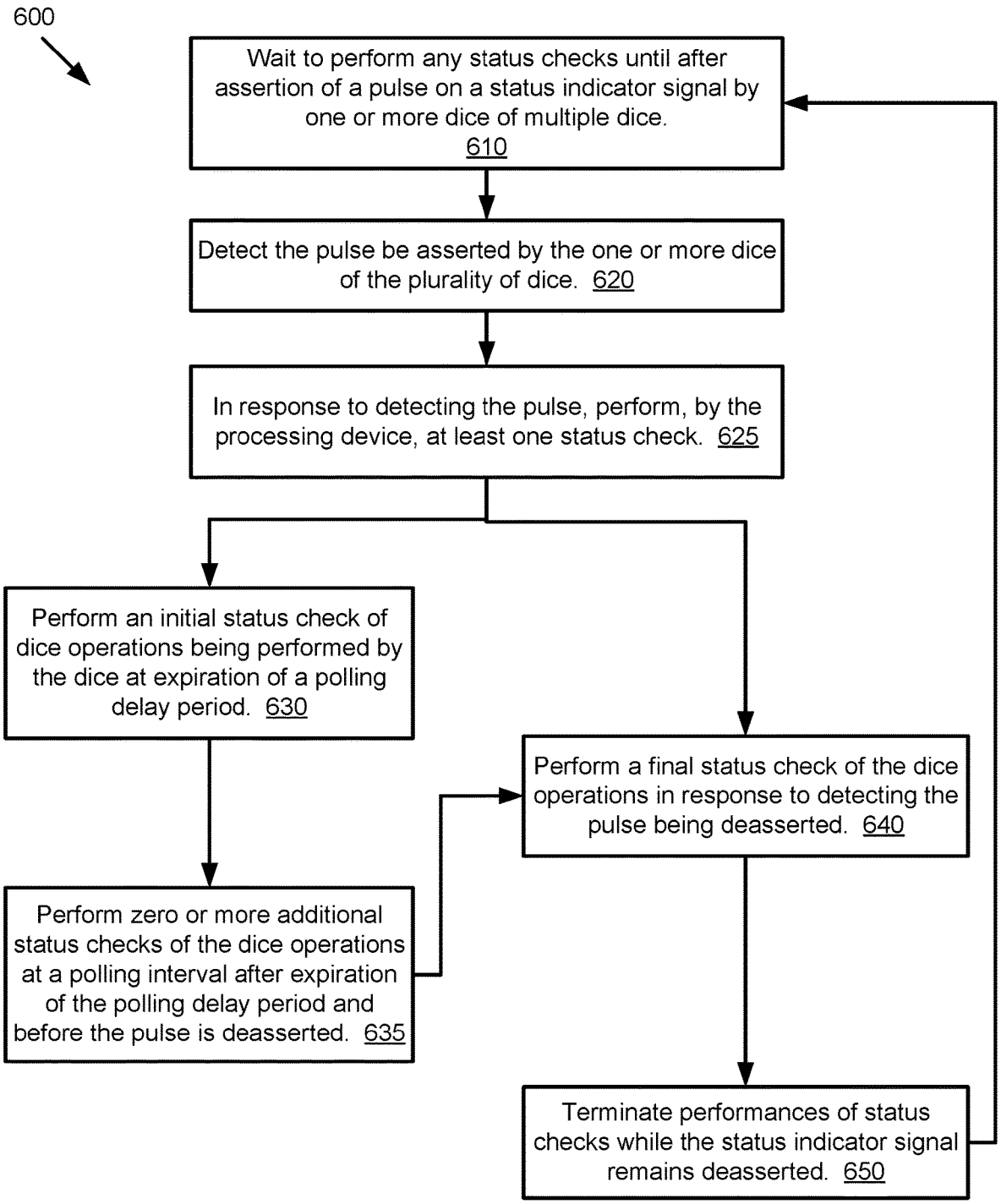
FIG. 6 is a flow diagram of an example method of performing status checks based on a die-generated pulsed signal according to an exemplary embodiment.

FIG. 6 is a flow diagram of an example method 600 of performing status checks based on a die-generated pulsed signal according to an exemplary embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by a processing device such as the memory sub-system controller 115 of FIG. 1A. In one embodiment, the method 600 is performed by the status polling component 113 of the memory sub-system controller 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, waiting is performed. For example, the processing logic waits to perform any status checks until after assertion of a pulse on a status indicator signal by one or more dice of the multiple dice 230. This default behavior of polling for status checks enables reducing congestion, and thus conserving bandwidth, across a communication bus or other interface between the controller 115 and the memory device(s) 130.

At operation 620, a pulse is detected. For example, the processing logic detects the pulse being asserted by the one or more dice of the multiple dice.

At operation 625, a status check is performed. For example, in response to detecting the pulse, perform at least one status check. For example, at operation 630, the processing logic performs an initial status check associated with dice operations being performed by the multiple dice at expiration of a polling delay period.

Further, at operation 635, additional status checks are performed. For example, the processing logic performs zero or more additional status checks associated with dice operations at a polling interval after the expiration of the polling delay period and before the pulse is deasserted. As with operation 540 (FIG. 5), if the pulse width is sufficiently longer than the polling delay period, the controller 115 performs at least one additional status check in response to reaching a polling interval period after the polling delay period.

At operation 640, a final status check is performed. For example, the processing logic performs a final status check of the dice operations in response to detecting the pulse being deasserted.

At operation 650, status checks are terminated. For example, the processing logic terminates performances of status checks while the status indicator signal remains deasserted. This default behavior of polling for status checks enables reducing congestion, and thus conserving bandwidth, across a communication bus or other interface between the controller 115 and the memory device(s) 130. The method 600 can then loop back to operation 510 to monitor for pulse(s) on the status indicator signal.

Figure 7:
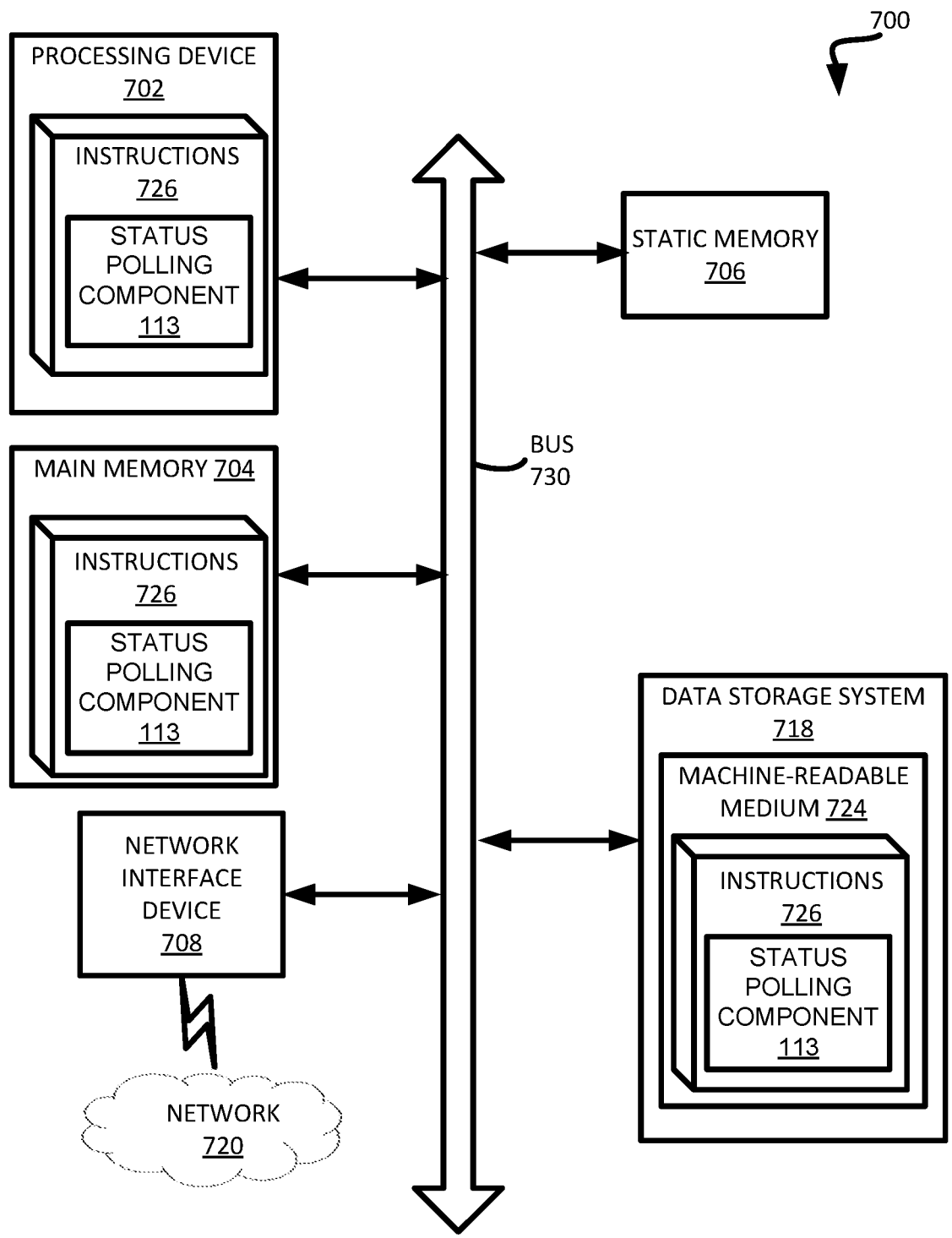
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the status polling component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 710 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 728 for performing the operations and steps discussed herein. The computer system 700 can further include a network interface device 712 to communicate over the network 720.

The data storage system 718 can include a machine-readable storage medium 724 (also known as a computer-readable medium) on which is stored one or more sets of instructions 728 or software embodying any one or more of the methodologies or functions described herein. The data storage system 718 can further include the local media controller 135, cache, and page buffers. The instructions 728 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1A.

In one embodiment, the instructions 728 include instructions to implement functionality corresponding to the status polling component 113 of FIG. 1A. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
a plurality of dice having a plurality of planes; and
a processing device coupled to the plurality of dice, the processing device to perform controller operations comprising:
receiving a status indicator signal comprising at least a first pulse that is asserted by a first plane and a second pulse that is asserted by a second plane of the plurality of dice, wherein the first pulse and the second pulse partially overlap to comprise an extended pulse that is longer than either of the first pulse or the second pulse;
initiating a polling delay period in response to detecting assertion of the extended pulse, wherein the polling delay period is greater than a pulse width of either of the first or second pulses; and
performing a first status check of dice operations being performed by the plurality of dice in response to detecting expiration of the polling delay period.

2. The memory system of claim 1, further comprising a ready busy pin coupled with the plurality of dice, the ready busy pin to receive the status indicator signal from the plurality of dice.

3. The memory system of claim 1, wherein each of the plurality of dice comprises respective control logic coupled to the first and second planes, wherein the respective control logic is to assert the first pulse and the second pulse to indicate a status of the dice operations for the first and second planes, respectively.

4. The memory system of claim 1, wherein the controller operations further comprise:
performing a final status check of the dice operations in response to detecting the extended pulse being deasserted; and
terminating performances of status checks while the status indicator signal remains deasserted.

5. The memory system of claim 1, wherein the controller operations further comprise performing one or more additional status checks of the dice operations at a polling interval after expiration of the polling delay period and before detecting the extended pulse being deasserted.

6. The memory system of claim 1, wherein the dice operations comprise one of a read operation, a program operation, an erase operation, or an error status.

7. A method comprising:
receiving, by a processing device that is coupled with a plurality of dice comprising a plurality of planes, a status indicator signal comprising at least a first pulse that is asserted by a first plane and a second pulse that is asserted by a second plane of the plurality of dice, wherein the first pulse and the second pulse partially overlap to comprise an extended pulse that is longer than either of the first pulse or the second pulse;
initiating a polling delay period in response to detecting assertion of the extended pulse, wherein the polling delay period is greater than a pulse width of either of the first or second pulses; and
performing, by the processing device, a first status check of dice operations being performed by the plurality of dice in response to detecting expiration of the polling delay period.

8. The method of claim 7, further comprising asserting, by respective control logic coupled with the first and second planes, the first pulse and the second pulse to indicate a status of the dice operations for the first and second planes, respectively.

9. The method of claim 7, further comprising:
performing a final status check of the dice operations in response to detecting the extended pulse being deasserted; and
terminating performances of status checks while the status indicator signal remains deasserted.

10. The method of claim 7, further comprising performing one or more additional status checks of the dice operations at a polling interval after expiration of the polling delay period and before detecting the extended pulse being deasserted.

11. The method of claim 7, wherein the dice operations comprise one of a read operation, a program operation, an erase operation, or an error status.

12. A method comprising:
waiting, by a processing device that is coupled with a plurality of dice of one or more memory devices, to perform any status checks until after assertion of a pulse on a status indicator signal;
detecting, by the processing device, the pulse being asserted by one or more dice of the plurality of dice, wherein the pulse is an extended pulse comprising at least a partial overlap of a first pulse asserted by a first die and a second pulse asserted by a second die of the plurality of dice;
initiating a polling delay period in response to detecting assertion of the extended pulse, wherein the polling delay period is greater than a pulse width of either of the first or second pulses; and
performing a first status check of dice operations being performed by the plurality of dice in response to detecting expiration of the polling delay period.

13. The method of claim 12, further comprising asserting, by respective control logic coupled with the plurality of dice, the extended pulse to indicate a status of the dice operations comprising one of an error status or completion of a read operation, a program operation, or an erase operation.

14. The method of claim 12, further comprising performing one or more additional status checks of the dice operations at a polling interval after expiration of the polling delay period and before detecting the extended pulse being deasserted, wherein each polling interval is set to be greater than or equal to the pulse width of either of the first pulse or the second pulse.

15. The method of claim 12, further comprising:
performing a final status check of the dice operations in response to detecting the extended pulse being deasserted; and
terminating, by the processing device, performances of status checks while the status indicator signal remains deasserted.

16. The method of claim 12, further comprising:
receiving a second status indicator signal comprising a third pulse that is asserted by sensor hardware of a third die of the plurality of dice;
in response to detecting the third pulse, performing a second status check of device operations being performed by the one or more memory devices at one of expiration of a second polling delay period after assertion of the second pulse or in response to detecting the third pulse being deasserted; and
terminating performances of status checks while the second status indicator signal remains deasserted.

17. The method of claim 16, wherein the device operations comprise one of a suspend completion of a memory operation, a power event status, a security event status, or a temperature status associated with the one or more memory devices.

* * * * *